(12) United States Patent
Souchet et al.

(10) Patent No.: US 9,895,938 B2
(45) Date of Patent: Feb. 20, 2018

(54) TIRE BEAD FOR AIRCRAFT

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Eric Souchet, Clermont-Ferrand (FR); Olivier Comps, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 272 days.

(21) Appl. No.: 14/647,028

(22) PCT Filed: Nov. 28, 2013

(86) PCT No.: PCT/EP2013/074925
§ 371 (c)(1),
(2) Date: May 22, 2015

(87) PCT Pub. No.: WO2014/083090
PCT Pub. Date: Jun. 5, 2014

(65) Prior Publication Data
US 2015/0290984 A1    Oct. 15, 2015

(30) Foreign Application Priority Data
Nov. 29, 2012    (FR) ..................... 12 61378

(51) Int. Cl.
*B60C 15/06*    (2006.01)
*B60C 15/05*    (2006.01)
(Continued)

(52) U.S. Cl.
CPC .......... *B60C 15/06* (2013.01); *B60C 15/0009* (2013.01); *B60C 15/0206* (2013.01);
(Continued)

(58) Field of Classification Search
CPC ............ B60C 15/00; B60C 2015/0614; B60C 2015/0657; B60C 2015/0678; B60C 2200/02
(Continued)

(56) References Cited

U.S. PATENT DOCUMENTS 2,755,214 A * 7/1956 Lyons .................. B60C 9/0042
152/451
5,107,915 A * 4/1992 Shimomura ............ B60C 15/06
152/543
(Continued)

FOREIGN PATENT DOCUMENTS

EP    0 770 504    5/1997
EP    0 881 104    12/1998
(Continued)

OTHER PUBLICATIONS

Definition of "Stiffness", https://en.wikipedia.org/wiki/Stiffness, accessed on Feb. 22, 2010.*
(Continued)

*Primary Examiner* — Alison L Hindenlang
*Assistant Examiner* — Yunju Kim
(74) *Attorney, Agent, or Firm* — Cozen O'Connor

(57) ABSTRACT

Aircraft tire (1) comprising two beads (2). In each bead (2) portion (8) comprises surface layer (9) in contact with rim (3) via radially interior bead face (4) and having a shear stiffness $K_1$. Portion (8) comprises a rigid layer (10), radially on the outside of and adjacent to the surface layer (9), having a shear stiffness $K_2$ at least equal to five times the shear stiffness $K_1$ of the surface layer (9), and a deformable layer (11), radially on the outside of and adjacent to the rigid layer (10) and radially on the inside of and adjacent to the carcass reinforcement portion (5) radially on the inside of the bead
(Continued)

wire (7), having a shear stiffness $K_3$ at most equal to 0.3 times the shear stiffness $K_1$ of the surface layer (9).

17 Claims, 1 Drawing Sheet

(51) Int. Cl.
*B60C 15/04* (2006.01)
*B60C 15/00* (2006.01)
*B60C 15/02* (2006.01)

(52) U.S. Cl.
CPC .............. *B60C 15/04* (2013.01); *B60C 15/05* (2013.01); *B60C 2015/0614* (2013.01); *B60C 2015/0657* (2013.01); *B60C 2015/0678* (2013.01); *B60C 2200/02* (2013.01)

(58) Field of Classification Search
USPC ........................................................ 152/543
See application file for complete search history.

(56) References Cited

U.S. PATENT DOCUMENTS

| | | | | |
|---|---|---|---|---|
| 5,309,971 A * | 5/1994 | Baker | .................... | B60C 15/06 152/541 |
| 5,476,129 A * | 12/1995 | Shoyama | .................. | B60C 3/04 152/454 |
| 5,499,670 A * | 3/1996 | Billieres | .................. | B60O 5/16 152/510 |
| 5,511,599 A * | 4/1996 | Willard, Jr. | ............. | B60C 13/00 152/454 |
| 5,876,527 A * | 3/1999 | Tsuruta | .................. | B60C 15/06 152/541 |
| 5,909,757 A * | 6/1999 | Kakumu | .................... | B60C 9/08 152/455 |
| 5,968,296 A * | 10/1999 | Ahouanto | ............... | B60C 15/05 152/516 |
| 5,979,527 A * | 11/1999 | Kobayashi | ................ | B60C 9/08 152/525 |
| 6,016,857 A * | 1/2000 | Roesgen | .................. | B60C 9/18 152/209.1 |
| 6,318,431 B1 * | 11/2001 | Ueyoko | .................... | B60C 3/04 152/539 |
| 6,543,504 B2 * | 4/2003 | Auxerre | .................... | B60C 3/04 152/539 |
| 6,659,148 B1 * | 12/2003 | Ali | ....................... | B60C 15/0027 152/539 |
| 8,272,416 B2 * | 9/2012 | Yamazaki | .............. | B60O 5/142 152/510 |
| 2005/0274444 A1 * | 12/2005 | Ueyoko | .............. | B60C 15/0072 152/543 |
| 2009/0056851 A1 * | 3/2009 | Maruoka | ................. | B60C 15/06 152/543 |
| 2009/0120553 A1 * | 5/2009 | Kachner | ............... | B60C 15/024 152/539 |

FOREIGN PATENT DOCUMENTS

| | | |
|---|---|---|
| EP | 1 381 525 | 4/2002 |
| EP | 1 452 346 | 9/2004 |

OTHER PUBLICATIONS

Definition of the "Young's modulus", https://en.wikipedia.org/wiki/Young%27s_modulus, accessed on Oct. 28, 2011.*

"Calculating percent elongation", http://schenectady.k12.ny.us/users/pattersont/IBDT%20Website/Page_Generators/PercentElongation.html, accessed on Nov. 5, 2010.*

Wang et al, A tough biodegradable elastomer, Nature Biotechnology 20, 602-606 (2002).*

Definition of "Elastomer", https://en.wikipedia.org/wiki/Elastomer, accessed on Nov. 30, 2010.*

"Dynamic mechanical analysis", https://en.wikipedia.org/wiki/Dynamic_mechanical_analysis, accessed on Apr. 18, 2010.*

Miller and Murray, "Wikipedia in Court: When and How Citing Wikipedia and Other Consensus Websites is Appropriate", http://scholarship.law.stjohns.edu/cgi/viewcontent.cgi?article=1020&context=lawreview, Spring 2010.*

Peoples, "The Citation of Wikipedia in Judicial Opinion", http://digitalcommons.law.yale.edu/cgi/viewcontent.cgi?article=1055&context=yjolt, Jan. 1, 2010.*

* cited by examiner

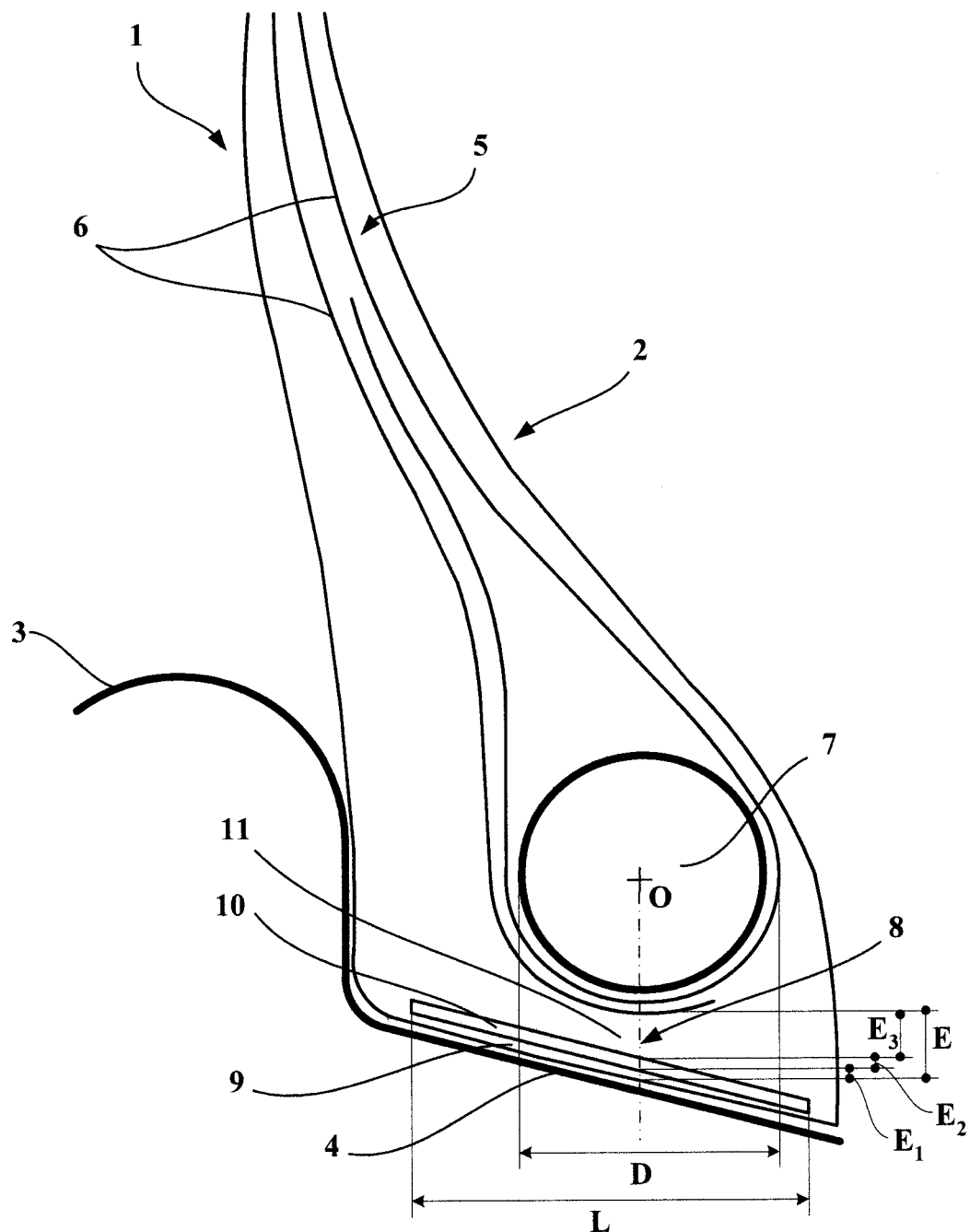

TIRE BEAD FOR AIRCRAFT

RELATED APPLICATIONS

This is a U.S. National Phase Application under 35 USC 371 of International Application PCT/EP2013/074925 filed on Nov. 28, 2013.

This application claims the priority of French application no. 1261378 filed Nov. 29, 2012, the entire content of which is hereby incorporated by reference

FIELD OF THE INVENTION

The present invention relates to an aircraft tire, use of which is characterized by high pressure, load and speed conditions.

BACKGROUND OF THE INVENTION

The pressure and load conditions, for a given size of aircraft tire, are defined in particular in the Tire and Rim Association standard, commonly referred to as the TRA standard. By way of indication, the pressure to which an aircraft tire is inflated is usually at least equal to 9 bar and the corresponding applied load is such that the deflection of the tire is at least equal to 30%. The deflection of the tire is, by definition, the radial deformation or variation in radial height thereof as it makes the transition from an unladen inflated state to a statically loaded inflated state under the pressure and load conditions as defined in the TRA standard.

A high speed condition means a speed that may be as high as 360 km/h during aircraft take-off or landing phases.

Tire beads are those parts of the tire, respectively connected by two sidewalls to a tread, which provide the mechanical connection between the tire and the rim on which it is mounted or mounting rim. The assembly formed by a tire and its mounting rim is referred to as a mounted assembly.

Because a tire has a geometry exhibiting symmetry of revolution with respect to an axis of rotation, its geometry can be described in a meridian plane containing its axis of rotation. In a given meridian plane, the radial, axial and circumferential directions respectively refer to the directions perpendicular to the axis of rotation, parallel to the axis of rotation and perpendicular to the meridian plane. In what follows, the expressions "radially on the inside" and "radially on the outside" respectively mean "closer to the axis of rotation in the radial direction" and "further from the axis of rotation in the radial direction". The expressions "axially on the inside" and "axially on the outside" respectively mean "closer to the equatorial plane in the axial direction" and "further from the equatorial plane in the axial direction", the equatorial plane being the plane perpendicular to the axis of rotation and passing through the middle of the tread.

A radial tire comprises a reinforcement, comprising a crown reinforcement, radially on the inside of the tread, and a carcass reinforcement, radially on the inside of the crown reinforcement.

The carcass reinforcement of a radial tire for an aircraft, as described for example in document EP 1 381 525, comprises at least one carcass layer.

A carcass layer is made up of reinforcing elements, or reinforcers, coated in an elastomeric material, mutually parallel and forming with the circumferential direction an angle substantially equal to 90°, i.e. comprised between 85° and 95°. The reinforcers are usually cords made up of spun textile filaments, preferably made of aliphatic polyamides and/or of aromatic polyamides.

A carcass layer is said to be turned up when, in each bead, it is wound around a circumferential reinforcing element, usually made of metal and of substantially circular meridian section, referred to as a bead wire, from the inside towards the outside of the tire to form a turnup, the end of which is radially on the outside of the radially outermost point of the bead wire. The turned-up carcass layers are generally the carcass layers closest to the interior cavity of the tire and therefore axially furthest towards the inside, in the sidewalls.

A carcass layer is said to be turned in when, in each bead, it is wound around a bead wire, from the outside towards the inside of the tire, as far as an end which is generally radially on the inside of the radially outermost point of the bead wire. The turned-in carcass layers are generally the carcass layers closest to the exterior surface of the tire and therefore those which are axially furthest out, in the sidewalls.

The mechanical connection between each tire bead and the rim is essentially achieved by two contact surfaces. A first contact surface, or contact surface under the bead wire is established, radially on the inside of the bead wire, between the radially interior face of the bead and a substantially axial rim portion, or rim seat, intended to fix the radial position of the bead when the tire is mounted and inflated. A second contact surface is established axially on the outside of the bead wire between the axially outside face of the bead and a substantially radial rim portion, or rim flange, intended to fix the axial position of the bead when the tire is mounted and inflated. The surfaces of contact between bead and flange, particularly the surface for contact under the bead wire, are zones under high pressure.

In each bead, radially on the inside of the carcass reinforcement portion radially on the inside of the bead wire, namely radially on the inside of the carcass layer which is radially innermost with respect to the bead wire, is positioned a portion of bead, referred to as the portion clamped under the bead wire, which is in contact via the radially interior face of the bead with the rim seat. This portion clamped under the bead wire dictates the forces of clamping between the bead of the tire and the rim seat. These clamping forces are dependent on the thickness of the portion clamped under the bead wire and on the mechanical properties of the material of which it is made.

The portion clamped under the bead wire comprises at least one layer called the surface layer, which is intended to come into contact with the rim seat via the axially interior face of the bead, usually made of an elastomeric material.

After curing, an elastomeric material is mechanically characterized by tensile stress/strain characteristics which are determined by tensile testing. This tensile testing is carried out by a person skilled in the art on a test specimen according to a known method, for example in accordance with international standard ISO 37, and under normal temperature (23+ or −2° C.) and moisture (50+ or −5% relative humidity) conditions as defined by international standard ISO 471. For an elastomeric material, the tensile stress measured for a 10% elongation of the test specimen is referred to as the elastic modulus M at 10% elongation and is expressed in mega pascals (MPa). The shear modulus G is defined as being equal to one third of the elastic modulus M to 10% elongation, assuming an incompressible elastomeric material characterized by a Poisson's ratio of 0.5. The shear modulus G is expressed in MPa or N/mm$^2$. The shear stiffness K of a layer of thickness E, expressed in mm, and of unit surface area S equal to 1 mm$^2$, made of an elastomeric material of shear modulus G, is equal to the product of the shear modulus G times the unit surface area S divided by the thickness E. The shear stiffness K is therefore expressed in N/mm.

The elastomeric material of a surface layer of a portion clamped under the bead wire usually has an elastic modulus at 10% elongation at least equal to 5 MPa and at most equal to 9 MPa.

In the case of a mounted assembly for an aircraft, a rim is dimensioned to provide a given number of take-off and landing cycles, for example 12000 cycles. The rim is inspected periodically, typically every 500 cycles. A rim is commonly withdrawn from service prematurely because of damage observed on the surfaces of contact with the beads of the tire, before it reaches the end of its theoretical life, for example midway through its life, namely after around 6000 cycles. This therefore leads to an economic loss relating to the use of the rim.

The damage is found on the rim seat in the surface for contact under the bead wire. This damage, referred to as "pitting" is surface defects of substantially elliptical shape characterized by a major axis which may be as long as 2 mm and a minor axis which may be as long as 0.5 mm, the depth of such defects potentially being as much as 0.5 mm. Defects of the maximum permissible size are referred to as critical size defects or critical defects. Beyond a critical size, defects are considered inadmissible and if they occur, the rim has to be withdrawn from service.

These defects or "pits" are the result of the known phenomenon of "wheel pitting". "Wheel pitting" is a phenomenon of localized rim wear by abrasion. The "pits" appear on the rim seat, in the surface for contact under the bead wire which is subjected to high pressures. They are the result of the rubbing of particles, trapped between the radially interior face of the bead and the rim seat, which act as abrasives. These particles may be the result of localized damage to the painted rim coating or to external contamination. These particles, in order to be damaging, need to be sufficiently hard. These particles are pulled along by slippages of the radially interior face of the bead on the rim seat. It is the combination of high pressures and slippages that causes the localized wearing of the rim. The lengths of slippage and the rate of slippage have an impact on the localized wearing of the rim. It must be noted that slippage occurs essentially in the meridian plane, in the axial direction, and secondarily in the circumferential direction. Skewing the tire, which is characterized by a non-zero angle between the equatorial plane of the tire and the direction of travel of the tire, accentuates the phenomenon, because of the increase in pressure and slippage in the surface for contact under the bead wire.

In order to reduce the "wheel pitting" phenomenon, technical solutions based on reducing the friction between the bead and the rim seat have been envisaged, either at rim level or at tire level. As far as the rim is concerned, friction may be reduced either by lubricating the rim using a suitable product or by using a rim coating that has a low coefficient of friction. As far as the tire is concerned, friction can be reduced by selecting, for the surface layer, an elastomeric material that contains oil that is exuded from the surface layer as the bead is compressed onto the rim and which therefore lubricates the rim. Friction on the tire side can also be reduced by adding to the bead a coating material that has a low coefficient of friction. Finally, decreasing the force with which the bead wire is clamped against the rim seat can also help to reduce friction, by reducing the contact pressures between the bead and the rim seat. The foregoing technical solutions, relating respectively to the rim and to the tire, can be used alone or in combination. They all have the disadvantage of increasing the risk of the tire rotating on its rim, under the effect of too great a reduction in the forces of friction between the bead and the rim seat.

SUMMARY OF THE INVENTION

One object of the invention is to reduce the rate at which critical defects or "pits" form on the rim seat in order to increase the life of the rim and therefore the number of the cycles for which it can be used before being withdrawn.

This object has been achieved by in accordance with one aspect of the invention directed to an aircraft tire comprising:

two beads respectively intended to come into contact with a rim via at least one radially interior bead face, a carcass reinforcement comprising at least one carcass layer connecting the two beads, the or each carcass layer, being wrapped, in each bead, around a circumferential reinforcing element having a meridian section of centre O and diameter D, referred to as a bead wire, in each bead, a portion clamped under the bead wire extending radially on the inside of a carcass reinforcement portion radially on the inside of the bead wire as far as the radially interior bead face, the portion clamped under the bead wire comprising a surface layer intended to come into contact with the rim via the radially interior bead face and having a shear stiffness K1, the portion clamped under the bead wire comprising a rigid layer, radially on the outside of and adjacent to the surface layer, having a shear stiffness K2 at least equal to five times the shear stiffness K1 of the surface layer, and the portion clamped under the bead wire comprising a deformable layer, radially on the outside of and adjacent to the rigid layer and radially on the inside of and adjacent to the carcass reinforcement portion radially on the inside of the bead wire, having a shear stiffness K3 at most equal to 0.3 times the shear stiffness K1 of the surface layer.

Whereas the tire of the prior art considered as reference comprises, in each bead, a portion clamped under the bead wire that comprises at least one surface layer, the tire according to an embodiment of the invention comprises, in each bead, a portion clamped under the bead wire that comprises a stack of at least three radially superposed layers.

The radially innermost layer is a surface layer intended to come into contact with the rim seat via the radially interior bead face.

Radially on the outside of and adjacent to the surface layer is positioned a rigid layer. What is meant by a rigid layer is a layer that has a shear stiffness $K_2$ at least equal to five times the shear stiffness $K_1$ of the surface layer.

Radially on the outside of and adjacent to the rigid layer is positioned a deformable layer. What is meant by a deformable layer is a layer that has a shear stiffness $K_3$ at most equal to 0.3 times the shear stiffness $K_1$ of the surface layer. The deformable layer is also radially on the inside of and adjacent to the carcass reinforcement portion radially on the inside of the bead wire.

Embodiments of the invention apply the approach of reacting the mechanical forces generated on the surface for contact under the bead wire at the interface between the axially interior face of the bead and the rim seat, through large deformations radially on the inside of the bead wire and small deformations in the radially exterior vicinity of the rim seat. In other words, by creating a shear stiffness gradient that decreases radially towards the inside between the rigid layer and the deformable layer the deformations are localized essentially radially on the inside of the bead wire rather than at the interface between the bead and the rim seat. This results in a reduction in the length of slippage or displacement of this interface and, therefore, in a delayed onset of defects or "pitting" on the rim seat.

The portion clamped under the bead wire advantageously has a radial thickness under the bead wire, in vertical alignment with the centre O of the meridian section of the bead wire, at least equal to 2 mm and at most equal to 3.5 mm. This range of thicknesses under the bead wire corresponds to an optimum of the forces clamping the bead to the rim seat, both allowing the tire to be mounted on its rim and ensuring there will be no rotation of the tire on its rim during use.

With the surface layer, the rigid layer and the deformable layer having, in vertical alignment with the centre O of the meridian section of the bead wire, respective radial thicknesses under the bead wire, the radial thickness under the bead wire of the surface layer is at most equal to the radial thickness under the bead wire of the rigid layer, and the radial thickness under the bead wire of the rigid layer is at most equal to the radial thickness under the bead wire of the deformable layer. In other words, there is a thickness gradient with thicknesses increasing radially towards the inside in the layers that make up the portion clamped under the bead wire.

The surface layer generally has a shear stiffness $K_1$ at least equal to 4 N/mm, corresponding to a maximum usual radial thickness under the bead wire of around 0.45 mm and a minimum elastic modulus $M_1$ at 10% elongation of the order of 5 MPa.

It is also advantageous for the surface layer to be made of an elastomeric material having an elastic modulus $M_1$ at 10% elongation at least equal to 5 MPa and at most equal to 9 MPa. The modulus $M_1$ needs to be high enough to guarantee the mechanical stability of the surface layer in use. Moreover, this is the elastomeric material usually employed in this position in the prior art.

The surface layer advantageously has a radial thickness under the bead wire at least equal to 0.125 times the radial thickness under the bead wire of the portion clamped under the bead wire. This minimum thickness makes it possible to minimize the radial compression of the surface layer, or in other words the crushing thereof, and to have movements in the contact surface which are dictated by the movements of the rigid layer. It also makes it possible to guarantee the mechanical integrity of the rigid layer by preventing it any direct contact with the rim seat and therefore any risk of abrasion. Finally, this minimum thickness corresponds to the minimum that can be technologically manufactured.

Advantageously, the rigid layer has a shear stiffness $K_2$ at most equal to 17 times the shear stiffness $K_1$ of the surface layer. Beyond this value of shear stiffness, the risk of the rigid layer failing becomes high.

The rigid layer is made of a material having an elastic modulus $M_2$ at 10% elongation at least equal to 15 times the elastic modulus $M_1$ at 10% elongation of the surface layer. The elastic modulus ratio $M_2/M_1$ needs to be high enough for the rigid layer to make an effective contribution to reducing movements in the surface of contact between the bead and the rim seat.

Advantageously, the rigid layer is made of a material having an elastic modulus $M_2$ at 10% elongation at most equal to 50 times the elastic modulus $M_1$ at 10% elongation of the surface layer. Beyond this value of the elastic modulus ratio $M_2/M_1$, the risk of the rigid layer failing becomes high.

According to one preferred embodiment, the rigid layer is made of a fabric comprising reinforcers that are mutually parallel and coated in an elastomeric material. This choice of material is necessary in order to achieve the elastic modulus levels desired for the material of which the rigid layer is made. A customary elastomeric material on its own is unable to reach these elastic modulus levels. Moreover, the choice to have parallel reinforcers makes it possible to have a material that is orthotropic, namely that has a different modulus of elasticity depending on whether it is the direction of the reinforcers or the direction perpendicular to the reinforcers that is considered. Moreover, the reinforcers make with the circumferential direction an angle of between 0° and 90°, and preferably of close to 0°, which corresponds to reinforcers oriented substantially in the circumferential direction.

According to one alternative form of the preferred embodiment, the reinforcers of the rigid layer are made of at least one textile material. Textile reinforcers are preferred to metallic reinforcers in the field of aircraft tires for weight-saving and safety reasons.

More preferentially, the reinforcers of the rigid layer are made of at least one textile material of the aromatic polyamide type. An aromatic polyamide, such as aramid for example, has a high modulus of elasticity making it possible to achieve the level of shear stiffness desired for the rigid layer.

The rigid layer has a radial thickness under the bead wire at least equal to 0.375 times the radial thickness under the bead wire of the portion clamped under the bead wire. This minimum radial thickness allows the use of textile fabric as a material of which to make the rigid layer.

The rigid layer has an axial width at least equal to the diameter of the bead wire and at most equal to twice the diameter of the bead wire. The rigid layer needs to extend axially over at least that part of the portion clamped under the bead wire that is subjected to the highest mechanical stresses, which substantially corresponds to an axial width of between once and twice the diameter of the bead wire. In addition, the rigid layer is a substantially axial layer which is wound neither axially towards the inside nor axially towards the outside around the bead wire.

The deformable layer is advantageously made of an elastomeric material having an elastic modulus $M_3$ at 10% elongation at most equal to the elastic modulus $M_1$ at 10% elongation of the surface layer. By definition, the deformable layer needs to have the lowest shear stiffness $K_3$ out of the at least three layers of which the portion clamped under the bead wire is formed. In any event, the elastic modulus $M_3$ at 10% of elongation of the elastomeric material of which the deformable layer is made needs to be lower than that of the elastomeric material of which the surface layer is made and possibly equal, particularly in the case where the materials of which the deformable layer and the surface layer are respectively made are identical for reasons of economic choice.

For preference, the deformable layer is made of an elastomeric material having an elastic modulus $M_3$ at 10% elongation at least equal to 0.5 times the elastic modulus $M_1$ at 10% elongation of the surface layer. This elastic modulus $M_3$ needs preferably to be significantly lower than that of the elastomeric material of the surface layer, for example of the order of half of same. However, in order to prevent the deformable layer from failing, it must not be too low.

Finally, the deformable layer has a radial thickness under the bead wire at least equal to 0.5 times the radial thickness under the bead wire of the portion clamped under the bead wire. This minimum thickness allows the deformable layer sufficient deformability without failing.

BRIEF DESCRIPTION OF THE SINGLE DRAWING

The features and other advantages of the invention will be better understood with the aid of the FIGURE which depicts a meridian section of a tire bead according to the invention.

The FIGURE has not been drawn to scale. Not all of the elements have necessarily been depicted.

DETAILED DESCRIPTION OF THE SINGLE DRAWING

The FIGURE shows a bead 2 of an aircraft tire 1 intended to come into contact with a rim 3 via at least one radially interior bead face 4. In the bead 2, two carcass layers 6 that make up a carcass reinforcement 5 are wound respectively from the inside towards the outside and from the outside towards the inside around a bead wire 7 having a meridian section of centre O and diameter D. A portion 8 clamped under the bead wire extends radially on the inside of a carcass reinforcement portion 5 radially on the inside of the bead wire 7 as far as the radially interior bead face 4.

The portion 8 clamped under the bead wire comprises three layers extending radially from the inside to the outside: a surface layer 9, a rigid layer 10 and a deformable layer 11 which, in vertical alignment with the centre O of the meridian section of the bead wire 7, has respective radial thicknesses $E_1$, $E_2$ and $E_3$ under the bead wire. The portion 8 clamped under the bead wire has a radial thickness E under the bead wire equal to the sum of the respective radial thicknesses $E_1$, $E_2$ and $E_3$ under the bead wire. In the embodiment depicted, the radial thickness $E_1$ under the bead wire of the surface layer 9 is less than the radial thickness $E_2$ under the bead wire of the rigid layer 10, itself less than the radial thickness $E_3$ under the bead wire of the rigid layer 11. In addition, the rigid layer 10 has an axial width L greater than the diameter D of the bead wire 7.

Embodiments of the invention have been developed more particularly for an aircraft tire having a radial carcass reinforcement of size 46×17.0R20, used on an airliner, and the nominal pressure of which is 15.9 bar, the nominal load of which is 20642 daN and the maximum speed of which is 378 km/h.

In the example studied, the surface layer is made of an elastomeric material having an elastic modulus $M_1$ at 10% elongation equal to 8 MPa, and having a radial thickness $E_1$ under the bead wire of 0.4 mm. The rigid layer is made up of a fabric the circumferentially oriented reinforcers of which are made of an aromatic polyamide of the aramid type and having an elastic modulus equal to 120 MPa, and has a radial thickness $E_2$ under the bead wire equal to 1.1 mm. Finally, the deformable layer is made of an elastomeric material having an elastic modulus $M_3$ at 10% elongation equal to 4 MPa, and a radial thickness $E_3$ under the bead wire equal to 1.5 mm. Therefore the portion clamped under the bead wire has a total radial thickness E under the bead wire equal to 3 mm.

In the example studied, numerical simulations by finite element calculation have shown that the movements in the surface of contact between the radially interior face of the bead and the rim seat were appreciably reduced for a tire according to the invention in comparison with the reference tire according to the prior art. Moreover, comparative tests of mounted assemblies comprising tires respectively according to the prior art and according to the invention have shown a significant reduction in the number of defects observed on the rim seat.

The invention is not restricted to a portion clamped under the bead wire that comprises three layers. It may be extrapolated to a portion clamped under the bead wire comprising more than three layers, at least two of which are deformable, in so far as the at least two deformable layers radially on the outside of the rigid layer constitute a shear stiffness gradient in which the shear stiffnesses decrease radially towards the outside, i.e. as they come radially closer to the bead wire. The stack of three layers may also be reduced, if appropriate, to two layers, when the surface layer is thin enough to be incorporated into the compound with which the textile reinforcers of the rigid layer are coated: in that case, the coating compound of the rigid layer, situated radially on the inside of the textile reinforcers, acts as a surface layer.

The invention claimed is:

1. An aircraft tire comprising:
   two beads respectively configured to come into contact with a rim via at least one radially interior bead face;
   a carcass reinforcement comprising at least one carcass layer connecting the two beads;
   the or each carcass layer, being wrapped, in each bead, around a circumferential reinforcing element having a meridian section of centre and diameter, referred to as a bead wire;
   in each bead, a portion clamped under the bead wire extending radially on the inside of a carcass reinforcement portion radially on the inside of the bead wire as far as the radially interior bead face;
   the portion clamped under the bead wire comprising a surface layer configured to come into contact with the rim via the radially interior bead face and having a shear stiffness $K_1$,
   wherein the portion clamped under the bead wire comprises a rigid layer, radially on the outside of and adjacent to the surface layer, having a shear stiffness $K_2$ at least equal to five times the shear stiffness $K_1$ of the surface layer; and
   wherein the portion clamped under the bead wire comprises a deformable layer, radially on the outside of and adjacent to the rigid layer and radially on the inside of and adjacent to the carcass reinforcement portion radially on the inside of the bead wire, having a shear stiffness $K_3$ at most equal to 0.3 times the shear stiffness $K_1$ of the surface layer.

2. The aircraft tire according to claim 1, wherein the portion clamped under the bead wire has a radial thickness under the bead wire, in vertical alignment with the centre of the meridian section of the bead wire, at least equal to 2 mm and at most equal to 3.5 mm.

3. The aircraft tire according to claim 1, the surface layer, the rigid layer and the deformable layer having, in vertical alignment with the centre of the meridian section of the bead wire, respective radial thicknesses under the bead wire, wherein the radial thickness under the bead wire of the surface layer is at most equal to the radial thickness under the bead wire of the rigid layer, and wherein the radial thickness under the bead wire of the rigid layer is at most equal to the radial thickness under the bead wire of the deformable layer.

4. The aircraft tire according to claim 1, wherein the surface layer has a shear stiffness $K_1$ at least equal to 4 N/mm.

5. The aircraft tire according to claim 1, wherein the surface layer is made of an elastomeric material having an elastic modulus $M_1$ at 10% elongation at least equal to 5 MPa and at most equal to 9 MPa.

6. The aircraft tire according to claim 1, wherein the surface layer has a radial thickness under the bead wire at least equal to 0.125 times the radial thickness under the bead wire of the portion clamped under the bead wire.

7. The aircraft tire according to claim 1, wherein the rigid layer has a shear stiffness $K_2$ at most equal to 17 times the shear stiffness $K_1$ of the surface layer.

8. The aircraft tire according to claim 1, wherein the rigid layer is made of a material having an elastic modulus $M_2$ at 10% elongation at least equal to 15 times the elastic modulus $M_1$ at 10% elongation of the surface layer.

9. The aircraft tire according to claim 1, wherein the rigid layer is made of a material having an elastic modulus $M_2$ at 10% elongation at most equal to 50 times the elastic modulus $M_1$ at 10% elongation of the surface layer.

10. The aircraft tire according to claim 1, wherein the rigid layer is made of a fabric comprising reinforcers that are mutually parallel and coated in an elastomeric material.

11. The aircraft tire according to claim 10, wherein the reinforcers of the rigid layer are made of at least one textile material.

12. The aircraft tire according to claim 10, wherein the reinforcers of the rigid layer are made of at least one textile material of the aromatic polyamide type.

13. The aircraft tire according to claim 1, wherein the rigid layer has a radial thickness under the bead wire at least equal to 0.375 times the radial thickness under the bead wire of the portion clamped under the bead wire.

14. The aircraft tire according to claim 1, wherein the rigid layer has an axial width at least equal to the diameter of the bead wire and at most equal to twice the diameter of the bead wire.

15. The aircraft tire according to claim 1, wherein the deformable layer is made of an elastomeric material having an elastic modulus $M_3$ at 10% elongation at most equal to the elastic modulus $M_1$ at 10% elongation of the surface layer.

16. The aircraft tire according to claim 1, wherein the deformable layer is made of an elastomeric material having an elastic modulus $M_3$ at 10% elongation at least equal to 0.5 times the elastic modulus $M_1$ at 10% elongation of the surface layer.

17. The aircraft tire according to claim 1, wherein the deformable layer has a radial thickness under the bead wire at least equal to 0.5 times the radial thickness under the bead wire of the portion clamped under the bead wire.

* * * * *